US012778099B2

(12) United States Patent
Wang

(10) Patent No.: US 12,778,099 B2
(45) Date of Patent: Nov. 3, 2026

(54) INTELLIGENT ELECTRIC FISHING REEL

(71) Applicant: Weihai Langbao Fishing Tackle CO., LTD, Weihai (CN)

(72) Inventor: Wei Wang, Weihai (CN)

(73) Assignee: Weihai Langbao Fishing Tackle CO., LTD, Weihai (CN)

( * ) Notice: Subject to any disclaimer, the term of this patent is extended or adjusted under 35 U.S.C. 154(b) by 162 days.

(21) Appl. No.: 19/026,069

(22) Filed: Jan. 16, 2025

(65) Prior Publication Data

US 2026/0182556 A1 Jul. 2, 2026

(30) Foreign Application Priority Data

Dec. 30, 2024 (CN) ......................... 202411969550.4
Dec. 30, 2024 (CN) ......................... 202423284702.5

(51) Int. Cl.
*A01K 89/017* (2006.01)
*A01K 89/015* (2006.01)

(52) U.S. Cl.
CPC ........ *A01K 89/017* (2013.01); *A01K 89/0184* (2015.05); *A01K 89/01902* (2015.05)

(58) Field of Classification Search
CPC .............. A01K 89/017; A01K 89/0183; A01K 89/0184; A01K 89/0186; A01K 89/01902
See application file for complete search history.

(56) References Cited

U.S. PATENT DOCUMENTS

| | | | | |
|---|---|---|---|---|
| 7,334,749 B2 * | 2/2008 | Terauchi | A01K 89/017 | 242/225 |
| 2005/0247809 A1 * | 11/2005 | Terauchi | A01K 89/017 | 242/250 |
| 2013/0119176 A1 * | 5/2013 | Kendra | A01K 89/01931 | 242/322 |
| 2015/0296762 A1 * | 10/2015 | Haraguchi | A01K 89/015 | 242/261 |
| 2016/0249595 A1 * | 9/2016 | Haraguchi | A01K 89/0183 | 242/283 |
| 2022/0079130 A1 * | 3/2022 | Pulkrabek | A01K 89/0182 | |
| 2022/0125027 A1 * | 4/2022 | Mori | A01K 89/0186 | |
| 2024/0298625 A1 * | 9/2024 | Gongwer | A01K 89/0184 | |

* cited by examiner

*Primary Examiner* — William A. Rivera
(74) *Attorney, Agent, or Firm* — Birchwood IP

(57) ABSTRACT

An intelligent electric fishing reel is provided, including a frame, a spool assembly arranged on the frame, a control system and an electric motor. The electric motor is configured to drive the spool assembly by means of a transmission mechanism, wherein the electric motor is configured to drive the spool by means of a small transmission gear and a large transmission gear in different rotation directions respectively to achieve a conversion between two different modes of line retraction, thereby guaranteeing a continuous output of pull force. The control system is reasonable in structure design, which can monitor a state of the electric reel and perform operations in time.

20 Claims, 19 Drawing Sheets

INTELLIGENT ELECTRIC FISHING REEL

CROSS-REFERENCE TO RELATED APPLICATIONS

This application claims priority to Chinese Patent Application No. 202411969550.4, filed on Dec. 30, 2024 and Application No. 202423284702.5, filed on Dec. 30, 2024 which is hereby incorporated by reference in its entirety.

TECHNICAL FIELD

The present disclosure relates to the field of fishing tackles, more particularly to an intelligent electric fishing reel.

BACKGROUND

Electric fishing reels are increasingly widely used by the vast number of fishing enthusiasts, especially for deep-sea fishing, everyone has an electric fishing reel, which not only can save labor but also can achieve a high fish catch. However, the existing electric fishing reels have the following defects. The transmission structure from an electric motor to a spool is unreasonable in design, which cannot guarantee a continuous output of pull force, and different winding modes need to be switched manually. During the processing of fishing, as one cannot stay by the electric reel all the time, when a fish is caught suddenly, the line cannot be retracted in time and the fish will pull the line for a very long distance, even the fish could run away. In addition, the power level and the working state of the electric motor both can impact the line retraction; therefore, learning the state of the electric fishing reel in time and performing corresponding operations can improve the fish catch rate and the fun of fishing. A digital display shell of the electric fishing reel is provided with a transparent window corresponding to an internal display screen, whereby to view the information on the display screen. The digital display shell needs to ensure a transparent position corresponds to the display screen while guaranteeing the waterproof performance. At present, the digital display shell is integrally injection molded with an acrylic material, and the resulted digital display shell has a good waterproof effect. However, the biggest defect is that there is a high reject rate and a high cost of production. In addition, when assembling the digital display structure, the positioning of various parts also greatly impacts the processing efficiency and the quality of product.

SUMMARY

It is an object of the present disclosure to provide an intelligent electric fishing reel, which can guarantee a continuous output of pull force during retraction of line and can learn in time a state of the electric fishing reel and perform operations, thus improving the fishing experience of users.

In order to achieve the above object, the present disclosure employs the following technical scheme.

An intelligent electric fishing reel includes a frame, a spool assembly arranged on the frame, a control system and an electric motor. The electric motor is configured to drive the spool assembly by means of a transmission mechanism. The transmission mechanism includes a planetary gear transmission system, a primary transmission gear, a secondary transmission gear, a third-stage transmission gear, a fourth-stage transmission gear and a spool transmission gear. The planetary gear transmission system is configured to drive the primary transmission gear to rotate. The secondary transmission gear includes a secondary transmission gear A and a secondary transmission gear B that rotate unidirectionally and in opposite directions. The third-stage transmission gear includes a small transmission gear and a large transmission gear. The secondary transmission gear A and the secondary transmission gear B are configured to drive the small transmission gear and the large transmission gear respectively. The small transmission gear, the large transmission gear and the fourth-stage transmission gear are engaged with one another. The fourth-stage transmission gear is engaged with the spool transmission gear. The electric motor is configured to rotate in different directions to drive the secondary transmission gear A or the secondary transmission gear B respectively to drive the spool assembly.

Both the secondary transmission gear A and the secondary transmission gear B are provided internally with an anti-reverse part and an installation part. Roller clutches fitting with the secondary transmission gear A and the secondary transmission gear B are provided with anti-reverse surfaces fitting with the anti-reverse parts to perform position limit, and the anti-reverse surfaces of the roller clutches corresponding to the secondary transmission gear A and the secondary transmission gear B face opposite directions.

The planetary gear transmission system includes a motor gear, a planetary gear and an inner gear. The frame is installed with a bearing chamber and the inner gear limited with the frame. A planetary frame assembly is provided with a bearing A and the planetary gear. The bearing A is arranged inside the bearing chamber on the frame to position the planetary frame assembly inside the frame. The electric motor is installed inside the frame. The motor gear is engaged with the planetary gear, and the primary transmission gear is installed on a main shaft of the planetary frame assembly.

The spool assembly is installed with a magnet. A support plate installed on the frame is provided with a sensor A configured to sense the magnet. The spool assembly is provided with a spool rotation sensing site, and the frame is provided with a sensor B configured to sense the spool rotation sensing site.

The control system includes a system button, a display screen, a mainboard, a control board and a speed regulation switch A. The control board is provided with a motor drive module configured to control a startup and a rotation speed of the electric motor. The mainboard is provided with a master chip CPU and a current detection module configured to detect a current magnitude of the electric motor, whereby to control the rotation direction of the electric motor to start the transmission of the small transmission gear or the large transmission gear according to the current magnitude of the electric motor.

The mainboard is provided with a line outgoing detection module and an alarm module. The sensor B is configured to sense the rotation of the spool assembly and transmit a signal to the line outgoing detection module to trigger the alarm module. When the alarm module works for more than certain time, the electric reel triggers a line retraction mode autonomously to start line retraction autonomously.

The mainboard is further provided with a battery detection module configured to detect a battery level, a speed detection module configured to detect a rotation speed of a spool, and a temperature detection module configured to detect a temperature of the mainboard.

The mainboard is provided with a radio communication module. The radio communication module is connected to a handheld controller independent of the fishing reel, and the handheld controller is provided with a button and a speed regulation button corresponding to the button and the speed regulation switch on the fishing reel.

The mainboard is provided with a radio communication module. The radio communication module is connected to a mobile APP. The mobile APP is provided with a button and a speed regulation button corresponding to the button and the speed regulation switch on the fishing reel.

The mainboard is provided with a radio communication module. The radio communication module is connected to a handheld controller and a mobile APP independent of the fishing reel. The handheld controller and the mobile APP are provided with a button and a speed regulation button corresponding to the button and the speed regulation switch on the fishing reel.

The handheld controller includes a controller main body, a controller liquid crystal screen, a controller button, a controller circuit board and a speed regulation switch B. A controller button cover, the controller liquid crystal screen and the controller button are installed on the controller main body. The controller button is installed inside the controller button cover. The controller circuit board presses down the controller button. The controller circuit board is fixed on the controller main body and presses against the controller button. The controller speed regulation switch is installed on the controller main body and connected to the controller circuit board through a wire.

The handheld controller is provided with an anti-slip ring and a clip

The frame is provided with a digital display cover plate. A digital display shell is installed on the digital display cover plate, and a waterproof chamber is formed between the digital display shell and the digital display cover plate. The digital display shell is provided with a button installation position and a display screen installation position. The digital display shell is provided with a window corresponding to the display screen, and the window is covered with a transparent cover independent of the digital display shell.

An inner side wall of the window is surrounded by a welding wire. The transparent cover is pressed onto the welding wire and fixed to the inner side wall of the window by means of ultrasonic welding.

The button installation position is provided with an installation hole. A limit platform is formed around the installation hole. A button cover A includes a press part and a limit part. The press part of the button cover A protrudes out through the installation hole. The limit part fits with the limit platform. The system button includes a press column and a support seat. The press column has a top end extending into the press part of the button cover and a bottom corresponding to an operation part on the mainboard.

The mainboard is provided with a positioning hole B. The digital display shell is provided with a positioning column B. The positioning column B fits with the positioning hole B.

The digital display cover plate is provided with a control board positioning clip bar and a control board fixing hole. The control board is provided with a positioning engaging groove and a fixing groove. The control board positioning clip bar fits with the positioning engaging groove, and a first fixing screw is inserted into the fixing groove and the control board fixing hole to fix the control board with the digital display cover plate.

The digital display cover plate is provided with a positioning column A and a first fixing hole. The digital display shell is provided with a positioning hole A and a second fixing hole. The positioning column A fits with the positioning hole A, and a second fixing screw is inserted into the second fixing hole and the first fixing hole to fix the digital display shell with the digital display cover plate.

The digital display cover plate is formed thereon with a control board support frame and a digital display shell support frame higher than a bottom thereof. The control board fixing hole is formed on the control board support frame. The positioning column A and the first fixing hole are provided on the digital display shell support frame, and a glue storage groove is formed between the control board support frame and the digital display shell support frame. The digital display shell is provided with a waterproof rib configured to fall into the glue storage groove.

The digital display shell is provided with a limit surface fitting with the digital display shell support frame.

The control board support frame and the digital display shell support frame are provided with line passing groove sections. The waterproof rib on the digital display shell and corresponding missing parts of the line passing groove sections form a line passing channel, and an outer side wall of the line passing channel is provided with a glue refill hole The digital display cover plate is provided with a buzzer hole. A buzzer is installed in the buzzer hole on the digital display cover plate.

The present disclosure has the following beneficial effects. (1) The electric motor is configured to drive the spool by means of a small transmission gear and a large transmission gear in different rotation directions respectively to achieve a conversion between two different modes of line retraction, thereby guaranteeing a continuous output of pull force. (2) The control system is reasonable in structure design, which can monitor a state of the electric reel and perform operations in time. (3) The window on the digital display shell is of a split structure. The transparent cover is separated from the digital display shell, which lowers the cost of production while meeting waterproof requirements. (4) A high positioning precision is achieved between the buttons, the digital display shell and the mainboard. The positional assembly is simple between the mainboard, the control board, the digital display shell and the digital display cover plate, achieving a high assembly efficiency and improving the efficiency of production.

BRIEF DESCRIPTION OF DRAWINGS

For a better understanding of the technical scheme in the embodiments of the present disclosure or in the prior art, accompanying drawings required to be used in the description of the embodiments or the prior art are simply illustrated below. Apparently, the accompanying drawings described below are some embodiments of the present disclosure merely. For the ordinary skill in the field, other accompanying drawings may be obtained according to these accompanying drawings without creative effort.

The accompanying drawings are described as below.

Figure 1:
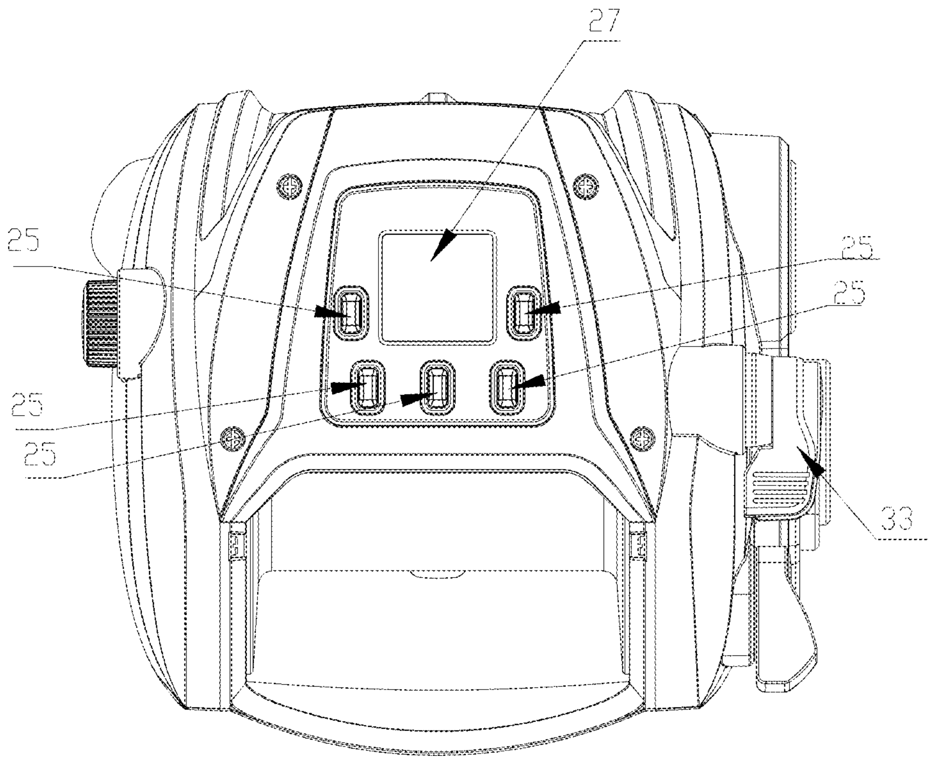
FIG. 1 is a structure diagram of a fishing reel.

Reference numerals in the drawings are illustrated as below.

frame; 2, bearing chamber; 3, inner gear; 4, planetary frame assembly; 4*a*, planetary gear; 4 *b*, bearing A; 5, electric motor; 5 *a*, motor gear; 6, spool assembly; 7, magnet; 8, spool transmission gear; 9, primary transmission gear; 10, shaft sleeve; 11, secondary transmission gear A; 11*a*, anti-reverse part; 11*b*, installation part; 12, secondary transmission gear B; 13, first transmission shaft; 14, support plate; 14*a*, second transmission shaft; 14*b*, gear box; 15, sensor A; 16, small transmission gear; 17, large transmission gear; 18, fourth-stage transmission gear; 19, bearing; 20, support plate cover; 21, 21, digital display cover plate; 211, buzzer hole; 212, control board support frame; 213, digital display shell support frame; 214, glue storage groove; 215, line passing groove section; 216, control board positioning clip bar; 217, control board fixing hole; 218, positioning column A; 219, first fixing hole; 22, buzzer; 23, control board; 231, positioning engaging groove; 232, fixing groove; 24, mainboard; 241, operation part; 242, positioning hole B; 25, system button; 251, press column; 252, support seat; 26, button cover A; 261, press part; 262, limit part; 27, display screen; 28, digital display shell; 281, button installation position; 281*a*, installation hole; 281*b*, limit platform; 282, display screen installation position; 283, window; 284, welding wire; 285, positioning column B; 286, positioning hole A; 287, second fixing hole; 288, waterproof rib; 289, line passing channel; 2810, glue refill hole; 2811, limit surface; 29, inner gear pin; 30, roller clutch; 30*a*, anti-reverse surface; 31, sensor B; 32, screw; 33, speed regulation switch A; 34, transparent cover; 35, first fixing screw; 36, second fixing screw;

401, master chip CPU; 402, display module; 403, motor drive module; 404, alarm module; 405, radio communication module; 406, speed regulation switch module; 407, line outgoing detection module; 408, temperature detection module; 409, current detection module; 410, speed regulation module; 411, speed detection module; 412, battery detection module;

50, handheld controller; 51, controller main body; 52, controller liquid crystal screen; 53, controller button cover; 54, controller button; 55, controller circuit board; 56, screw; 57, rear cover; 58, battery; 59, battery cover; 510, controller speed regulation switch; 511, anti-slip ring; 512, clip.

DESCRIPTION OF EMBODIMENTS

The purpose, technical scheme and advantages of the embodiments of the present disclosure will become more clearly understood from the clear and complete description of the technical scheme of the embodiments of the present disclosure below taken in conjunction with accompanying drawings in the embodiments of the present disclosure. Obviously, the embodiments described hereinafter are simply part embodiments of the disclosure, rather all of the embodiments. Generally, the assemblies of the embodiments of the present disclosure described and shown in the drawings herein can be deployed and designed in a variety of arrangements.

In the description of the present disclosure, unless otherwise specifically stated and defined, terms such as “be provided with”, “installed”, “interconnected”, “connected”, etc. should be interpreted expansively. For example, they may be fixed connection, also may be detachable connection, or integration; may be mechanical connection, also may be electrical connection; may be direct connection, also may be indirect connection through an intermediate, and may be internal communication between two elements. The ordinary skill in this field can understand the specific implication of the above terms in the present disclosure in accordance with specific conditions.

Figure 2:
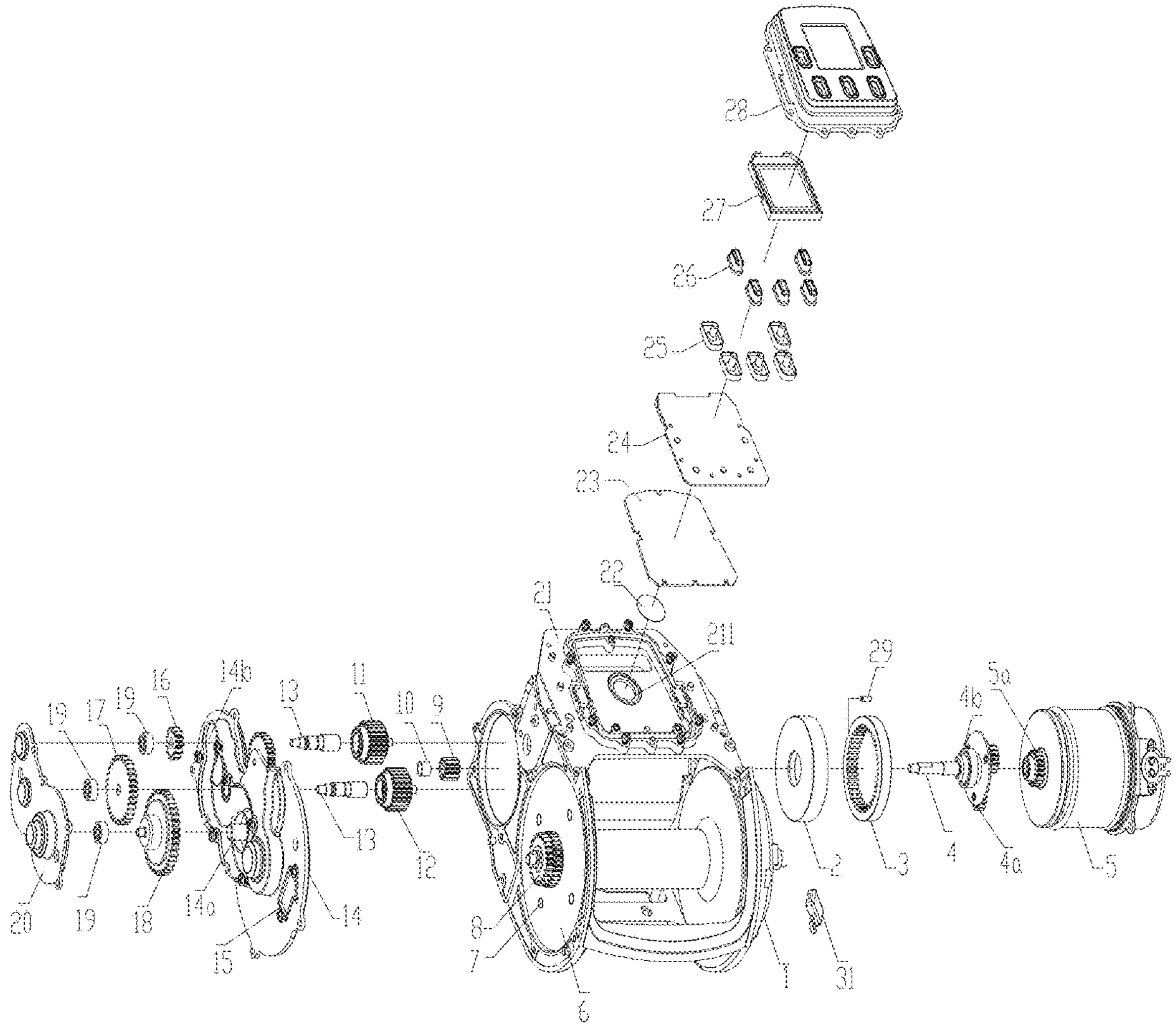
FIG. 2 is an exploded view of a fishing reel.
Figure 3:
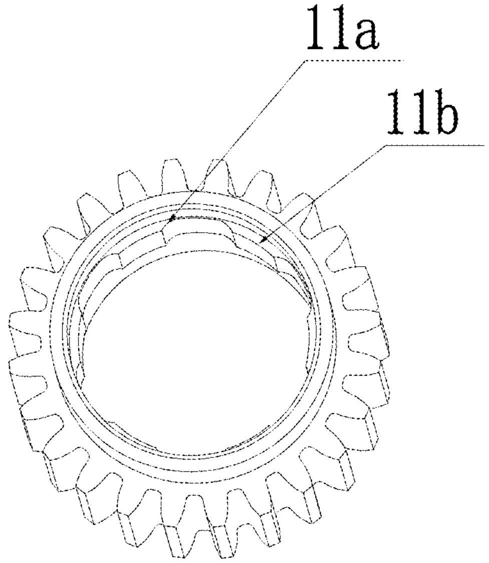
FIG. 3 is a structure diagram of a secondary transmission gear A.
Figure 4:
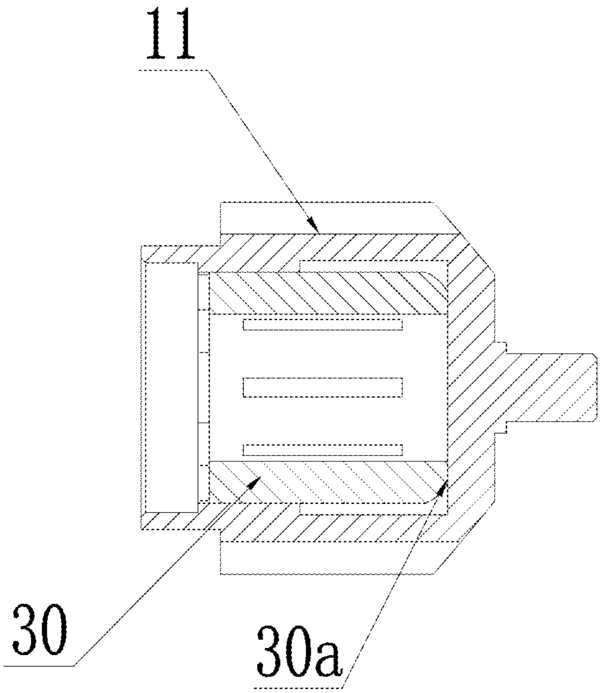
FIG. 4 is a diagram of a secondary transmission gear A fitting with a roller clutch.
Figure 5:
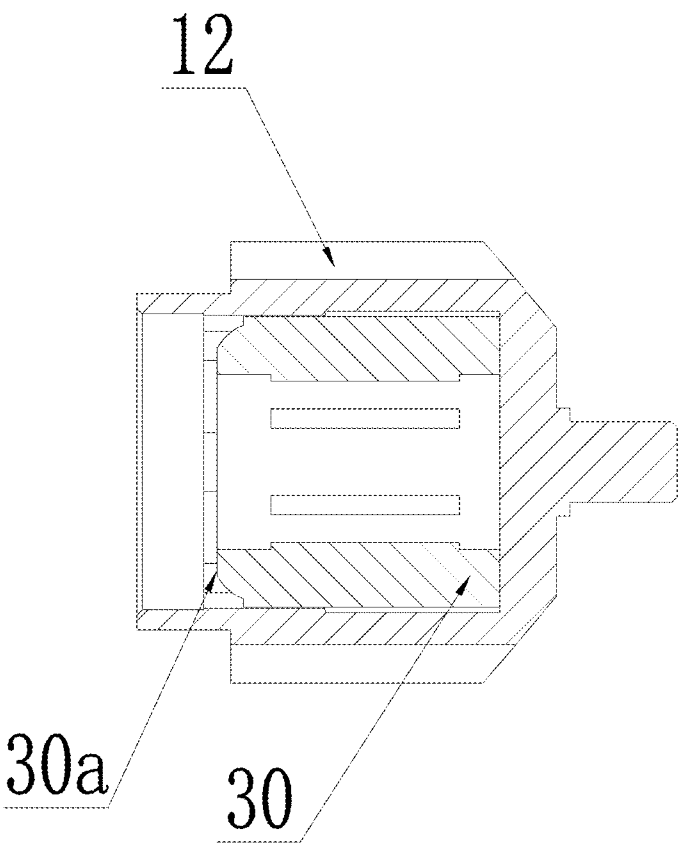
FIG. 5 is a diagram of a secondary transmission gear B fitting with a roller clutch.
Figure 6:
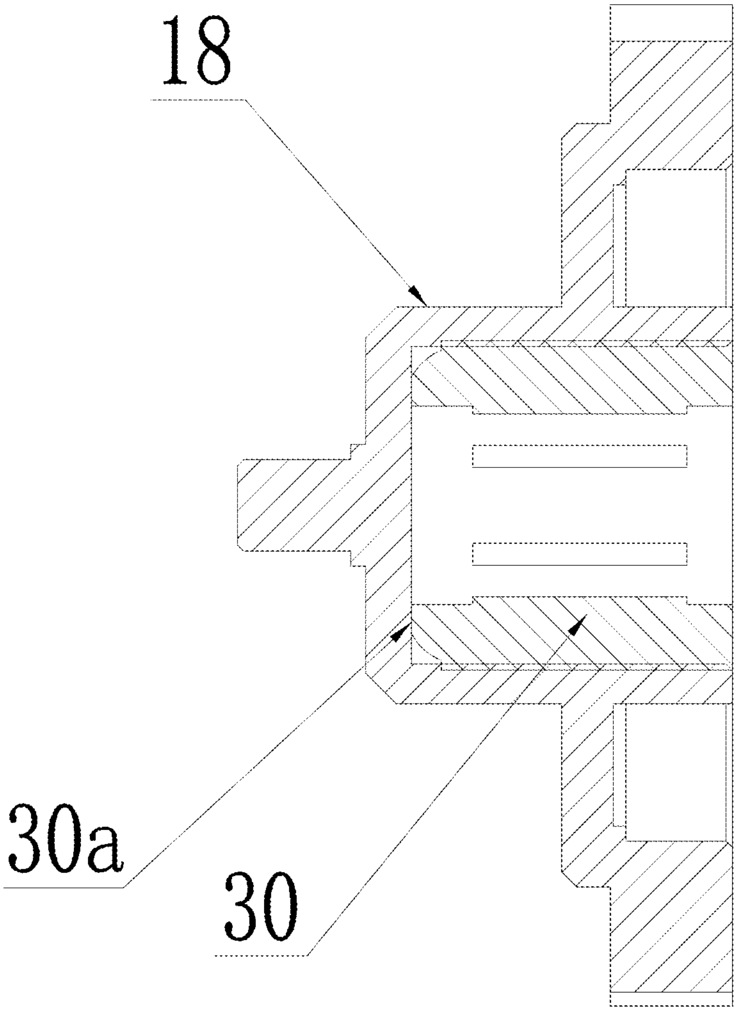
FIG. 6 is a diagram of a fourth-stage transmission gear fitting with a roller clutch.
Figure 7:
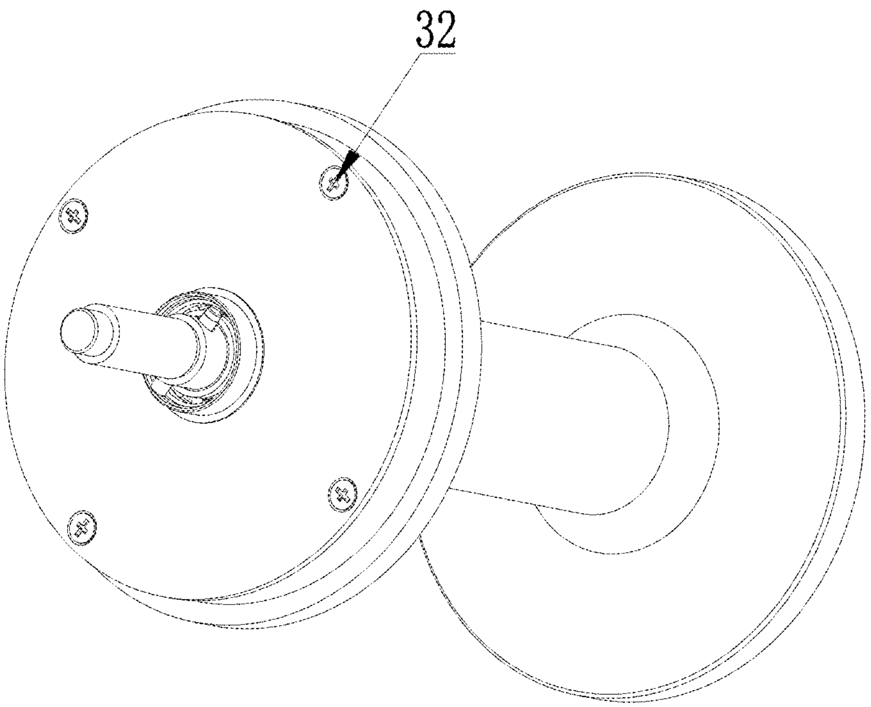
FIG. 7 is a structure diagram of a spool assembly.

Referring to FIG. 1 and FIG. 2, an intelligent electric fishing reel includes a frame 1, a spool assembly 6 arranged on the frame 1, a control system and an electric motor 5. The electric motor 5 is configured to drive the spool assembly 6 by means of a transmission mechanism. The transmission mechanism includes a planetary gear transmission system, a primary transmission gear 9, a secondary transmission gear, a third-stage transmission gear, a fourth-stage transmission gear 18 and a spool transmission gear 8. The planetary gear transmission system is configured to drive the primary transmission gear 9 to rotate. The secondary transmission gear includes a secondary transmission gear A 11 and a secondary transmission gear B 12 that rotate unidirectionally and in opposite directions. The third-stage transmission gear includes a small transmission gear 16 and a large transmission gear 17. The secondary transmission gear A 11 and the secondary transmission gear B 12 are configured to drive the small transmission gear 16 and the large transmission gear 17 respectively by means of second transmission shafts 13. The small transmission gear 16, the large transmission gear 17 and the fourth-stage transmission gear 18 are engaged with one another, which are installed in a gear box 14*b* on a support plate 14. The small transmission gear 16, the large transmission gear 17 and the fourth-stage transmission gear 18 are fixed in the gear box 14*b* by means of three bearings 19 respectively, and then a support plate cover 20 is employed to cover the gear box 14*b*, ensuring the stability of positions of the three gears. The fourth-stage transmission gear 18 is engaged with the spool transmission gear 8. The electric motor 5 is configured to rotate in different directions to drive the secondary transmission gear A 11 or the secondary transmission gear B 12 respectively to drive the spool assembly 6.

Both the secondary transmission gear A 11 and the secondary transmission gear B 12 are provided internally with an anti-reverse part 11*a* and an installation part 11*b*. Roller clutches 30 fitting with the secondary transmission gear A 11 and the secondary transmission gear B 12 are provided with anti-reverse surfaces 30*a* fitting with the anti-reverse parts 11*a* to perform position limit. The anti-reverse surfaces 30*a* of the roller clutches 30 corresponding to the secondary transmission gear A 11 and the secondary transmission gear B 12 face opposite directions. The fourth-stage transmission gear 18 is provided internally with a roller clutch 30 configured to be installed on a second transmission shaft 14*a* on the support plate 14 and rotate around it.

The planetary gear transmission system includes a motor gear 5*a*, a planetary gear 4*a* and an inner gear 3. The frame 1 is installed with a bearing chamber 2 and the inner gear 3. The inner gear 3 is fixed with the frame by means of an inner gear pin 29, whereby the inner gear 3 is limited onto the frame 1, preventing the inner gear 3 rotating. A planetary frame assembly 4 is provided with a bearing A 4*b* and the planetary gear 4*a*. The bearing A 4*b* is arranged inside the bearing chamber 2 on the frame 1 to position the planetary frame assembly 4 inside the frame 1. The electric motor 5 is installed inside the frame 1. The motor gear 5*a* is engaged with the planetary gear 4*a*. The primary transmission gear 9 is installed on a main shaft of the planetary frame assembly 4 and is fixed by means of a shaft sleeve 10.

When the electric fishing reel is retracting line in a SPEED mode, the electric motor 5 rotates clockwise and drives the motor gear 5*a*. The motor gear 5*a* and the planetary gear 4*a* and the inner gear 3 form the planetary gear transmission system, where the inner gear 3 does not rotate and the planetary frame assembly 4 rotates. The planetary frame assembly 4 drives the primary transmission gear 9 to rotate, and the primary transmission gear 9 drives the secondary transmission gear B 12 to rotate. Due to the function of the roller clutch 30, the secondary transmission gear A 11 and the small transmission gear 16 are in an idle state. The secondary transmission gear B 12 drives the large transmission gear 17, the fourth-stage transmission gear 18 and the spool transmission gear 8 to rotate, whereby driving the spool to rotate and thus completing the line retraction. This mode has a high speed of line retraction, and the electric reel has a small pull force.

When the electric reel is retracting line in a POWER mode, the electric motor 5 rotates anticlockwise, and the primary transmission gear 9 drives the secondary transmission gear A 11 to rotate. Due to the function of the roller clutch 30, the secondary transmission gear B 12 and the large transmission gear 17 are in an idle state, where the large transmission gear 17 equals an idle gear and functions as transmission. The secondary transmission gear A 11 drives the small transmission gear 16 to rotate, and the small transmission gear 16 drives the large transmission gear 17, the fourth-stage transmission gear 18 and the spool transmission gear 8 to rotate, whereby completing the line retraction. This mode has a low speed of line retraction, and the electric reel has a great pull force. With different modes of line retraction, a continuous output of pull force can be guaranteed.

The spool assembly 6 is installed with a magnet 7. The support plate 14 installed on the frame 1 is provided with a sensor A 15 configured to sense the magnet 7. The spool assembly 6 is provided with a spool rotation sensing site, and the frame 1 is provided with a sensor B 31 configured to sense the spool rotation sensing site. The spool rotation sensing site just needs to be different than a plane of a spool end cover, for example, a recess or a protrusion may be processed on the spool end cover. In the present embodiment, a screw 32 configured to fix the spool end cover is directly used as the spool rotation sensing site. When the electric reel is retracting line, the spool assembly 6 rotates, and the magnet 7 rotates following the spool assembly 6. When the magnet 7 passes through the sensor A 15, the sensor A 15 generates a magnet induction signal, and the signal is transmitted via a wire to a speed detection module 411 on the mainboard 24. Then, by the calculation of a master chip CPU 401, the speed value of line retraction is displayed on a display screen 27 through a display module 402. The sensor B 31 is a light sensor connected to the mainboard 24 via a wire. When a setting button is pressed down, a line outgoing detection module 407 is started, then if the spool assembly 6 rotates, the sensor B 31 senses the rotation of the screw 32 on the spool assembly 6 and generates a signal that is transmitted to the line outgoing detection module 407 and the master chip CPU 401 on the mainboard 24 via a wire. The master chip CPU 401 issues an instruction that is transmitted to an alarm module 404 via a wire, then the alarm module 404 drives a buzzer 22 to generate an alarm sound.

Figure 8:
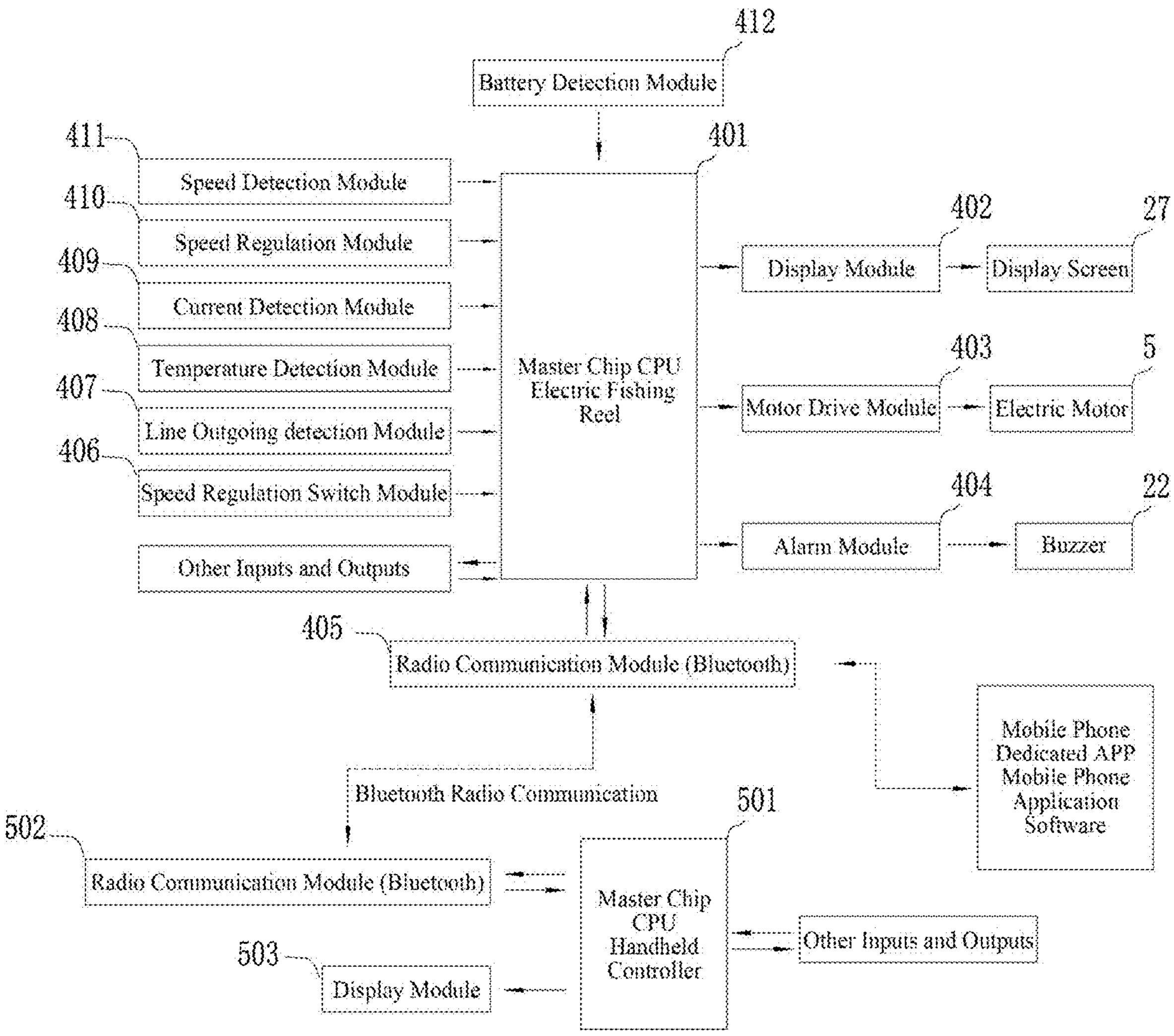
FIG. 8 is a schematic diagram of control.

Referring to FIG. 1, FIG. 2 and FIG. 8, the control system of the electric fishing reel mainly includes a system button 25, the display screen 27, the mainboard 24, a control board 23 and a speed regulation switch A 33. The system button 25 is provided externally with a button cover A 26 for protection thereof. The digital display shell 28 is installed internally with the mainboard 24, the display screen 27 and the control board 23. The buzzer 22 is installed in a buzzer hole 211 of a digital display cover plate 21. The display screen 27 is installed in the digital display shell 28. The display screen 27, the control board 23 and the buzzer 22 are connected to the mainboard 24 via wires, and the mainboard 24 can transmit signals to them for control thereof. The sensor A 15 installed on the support plate 14 is also connected to the mainboard 24 via a wire, and it can transmit a signal to the mainboard 24. The control board 23 is provided with a motor drive module 403 configured to control the startup and rotation speed of the electric motor 5. The mainboard 24 is composed of a master chip CPU 401, a speed detection module 411, a temperature detection module 408, a battery detection module 412, a current detection module 409, a line outgoing detection module 407, a speed regulation switch module 406, a speed regulation module 410, an alarm module 404, a display module 402 and a radio communication module 405. The system button 25 is configured to set various functions of the electric reel. The display module 402 is configured to control the display screen 27 to display a working state of the electric reel, the number of meters of the line outgoing and retracted, a battery level, a speed of line retraction and the like functions. The speed regulation switch A 33 controls the speed regulation switch module 406 and speed regulation module 410, and controls the motor drive module 403 through the master chip CPU 401 to start the electric motor 5 and regulate the speed of the electric motor 5. The speed detection module 411 detects the speed of rotation of the spool of the electric reel, calculates a speed of line retraction through the master chip CPU 401 and displays it on the display screen 27 through the display module 402. The temperature detection module 408 is configured to detect a working temperature of a circuit board. When detecting that the working temperature of the circuit board is higher than a preset value, the temperature detection module 408 transmits a signal to the master chip CPU 401. The master chip CPU 401 controls the motor drive module 403 to stop the operation of the electric motor 5, whereby protecting the circuit board, and meanwhile displays alarm information on the display screen and generates an alarm sound by means of the alarm module 404.

The current detection module 409 is mainly configured to detect a current magnitude input into the electric motor 5, whereby controlling the electric motor 5 according to the current magnitude. When the pull force of the electric motor 5 is small, the electric reel is operating in the SPEED mode, then the electric motor 5 rotates clockwise, the motor gear 5*a* drives the large gear set to rotate, and there is a high speed of line retraction. When the pull force of the electric motor 5 becomes greater and the SPEED mode can no longer meet the requirement of the pull force, the current increases. When the current detection module 409 detects that the current exceeds a preset value, the system will switch into the POWER mode autonomously to keep the optimal working state of the electric motor 5. Then, the electric motor 5 rotates anticlockwise, the motor gear 5*a* drives the small gear set to rotate; as a consequence, the pull force of the electric motor 5 becomes greater and the speed of the line retraction becomes slower. When the current detection module 409 detects that the current of the electric motor 5 exceeds a specific value, the system will cut off the current of the electric motor 5 to protect the electric motor 5, then the electric motor 5 stops working.

The battery detection module 412 is configured to detect a battery level and display the remaining capacity on the display screen 27. When the remaining capacity is too low, the system will remind a user to replace the battery 58 in time by flashing a battery level indicator, whereby avoiding the occurrence of insufficient power of the electric motor 5 due to low battery, which could slow down the speed of line retraction, reduce the pull force of the electric reel and stop the operation of the electrical reel suddenly.

The line outgoing detection module 407 is configured to notify a user in time that a fish is caught and remind the user to retract line. When the electric reel unwinds all of the line, a clutch switch is reset, a setting button is pressed down, and the line outgoing detection module 407 is started. When the line outgoing detection module 407 detects that the electric reel is outgoing line, it triggers the alarm module 404 to drive the buzzer 22 to generate an alarm sound. When the alarm module works for more than certain time, the electric reel triggers the line retraction mode autonomously to start line retraction.

Figure 9:
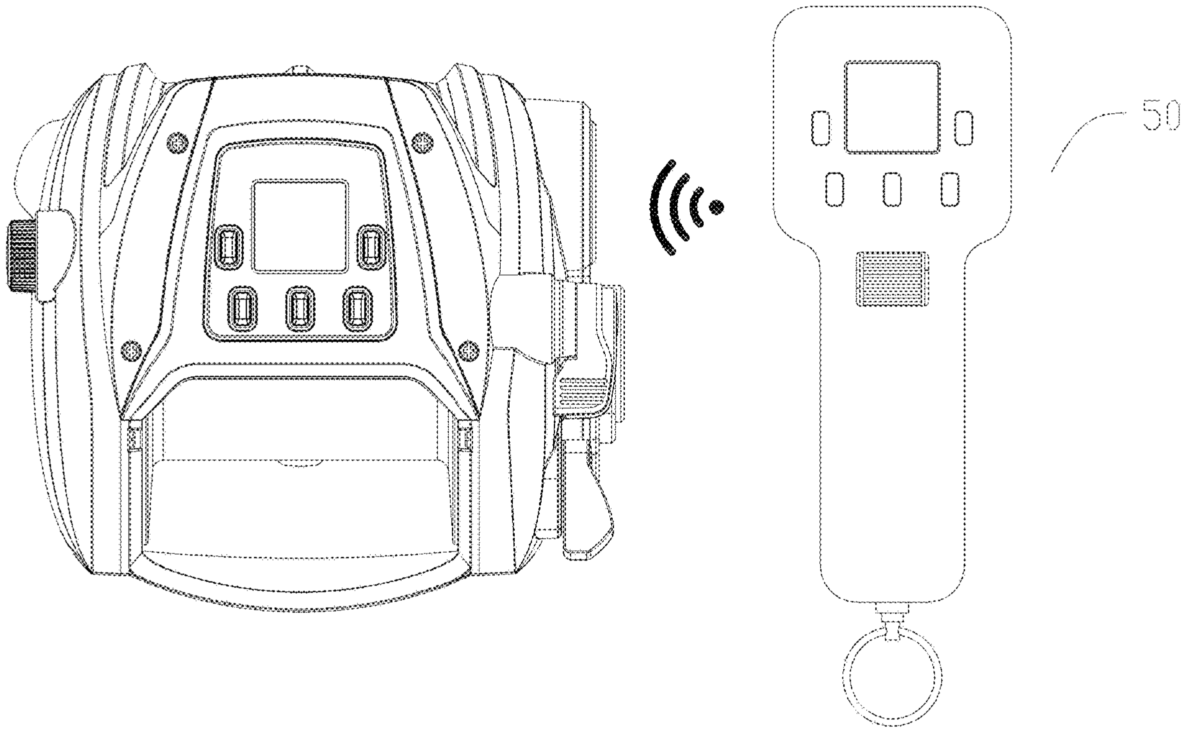
FIG. 9 is a diagram of communication between a fishing reel and a handheld controller.
Figure 10:
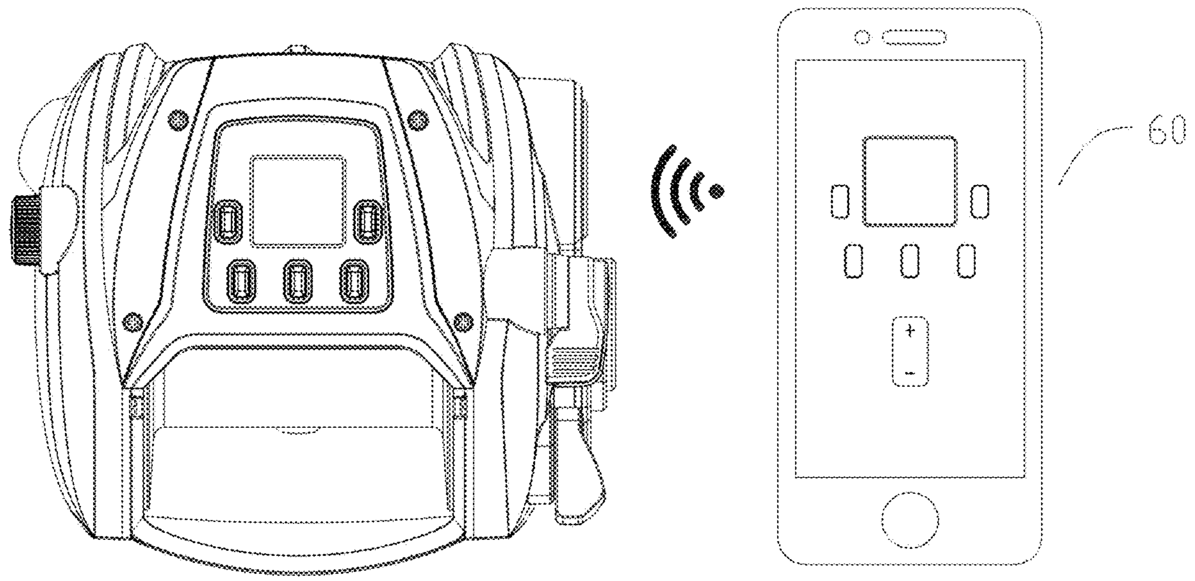
FIG. 10 is a diagram of communication between a fishing reel and a mobile phone.

The mainboard 24 is provided with a radio communication module 405. The radio communication module 405 is connected to a handheld controller 50 independent of the fishing reel. The handheld controller 50 is provided with a button and a speed regulation button corresponding to the button and the speed regulation switch on the fishing reel. The radio communication module 405 is connected to a mobile APP. The mobile APP is provided with a button and a speed regulation button corresponding to the button and the speed regulation switch on the fishing reel. The radio communication module 405 is connected to a handheld controller 50 and a mobile APP independent of the fishing reel. The handheld controller 50 and the mobile APP are both provided with a button and a speed regulation button corresponding to the button and the speed regulation switch on the fishing reel. The radio communication module 405 is connected to the handheld controller 50 or a mobile phone 60, whereby controlling the electric reel. The handheld controller 50 or the mobile APP 60 may establish a communication with the fishing reel by means of Bluetooth, as shown in FIG. 9 and FIG. 10. With this scheme, the fishing reel is more convenient to use. Users can operate the speed regulation switch of the fishing reel in time to perform line retraction and can perform other operations, without needing to stay by the fishing reel all the time.

Figure 11:
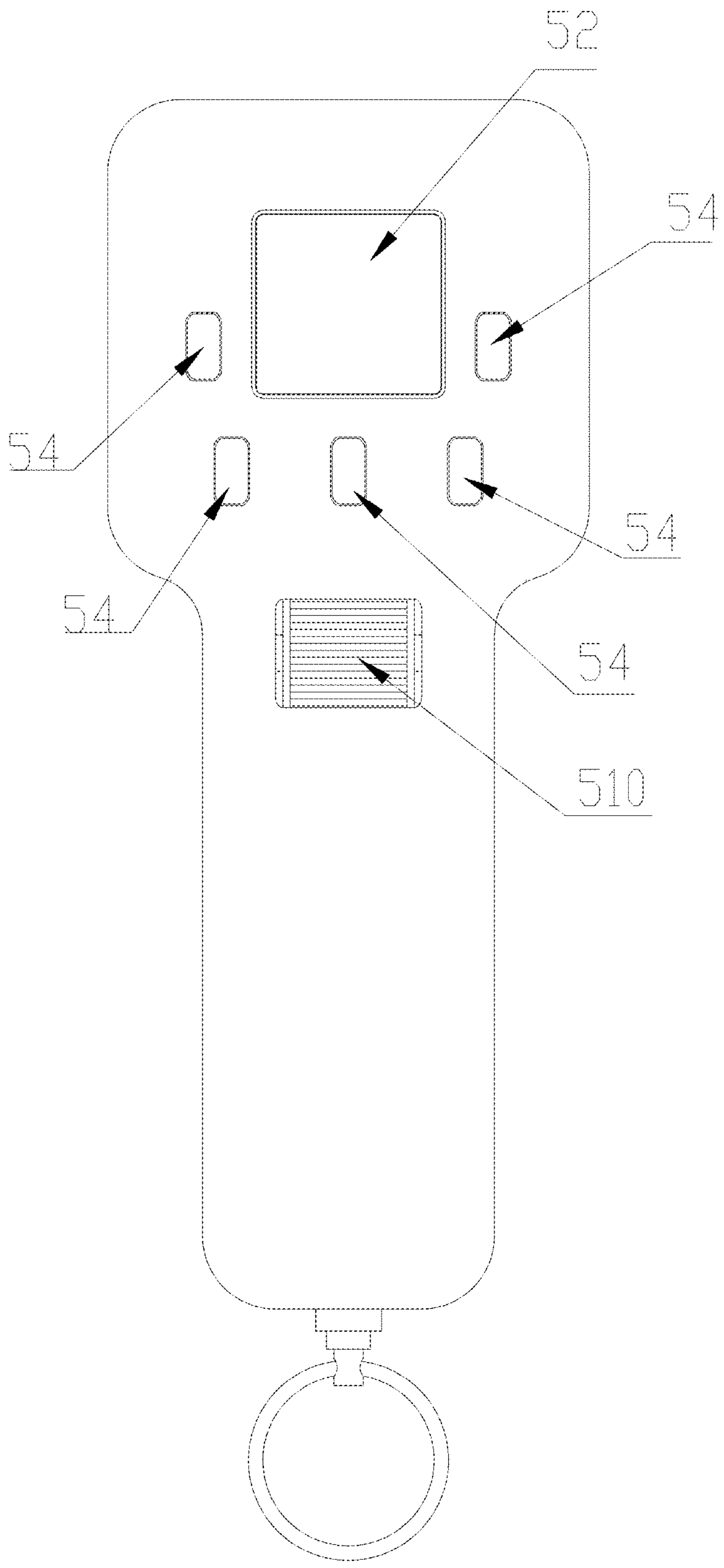
FIG. 11 and FIG. 12 are structure diagrams of a handheld controller.
Figure 12:
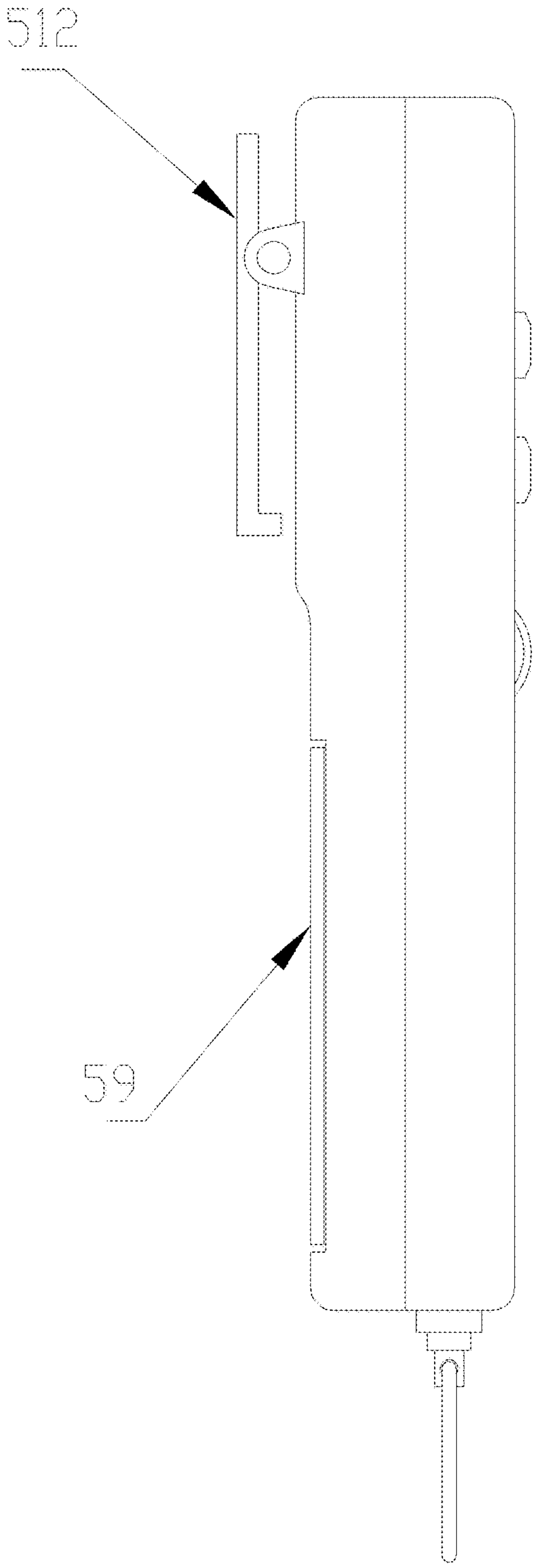
Figure 13:
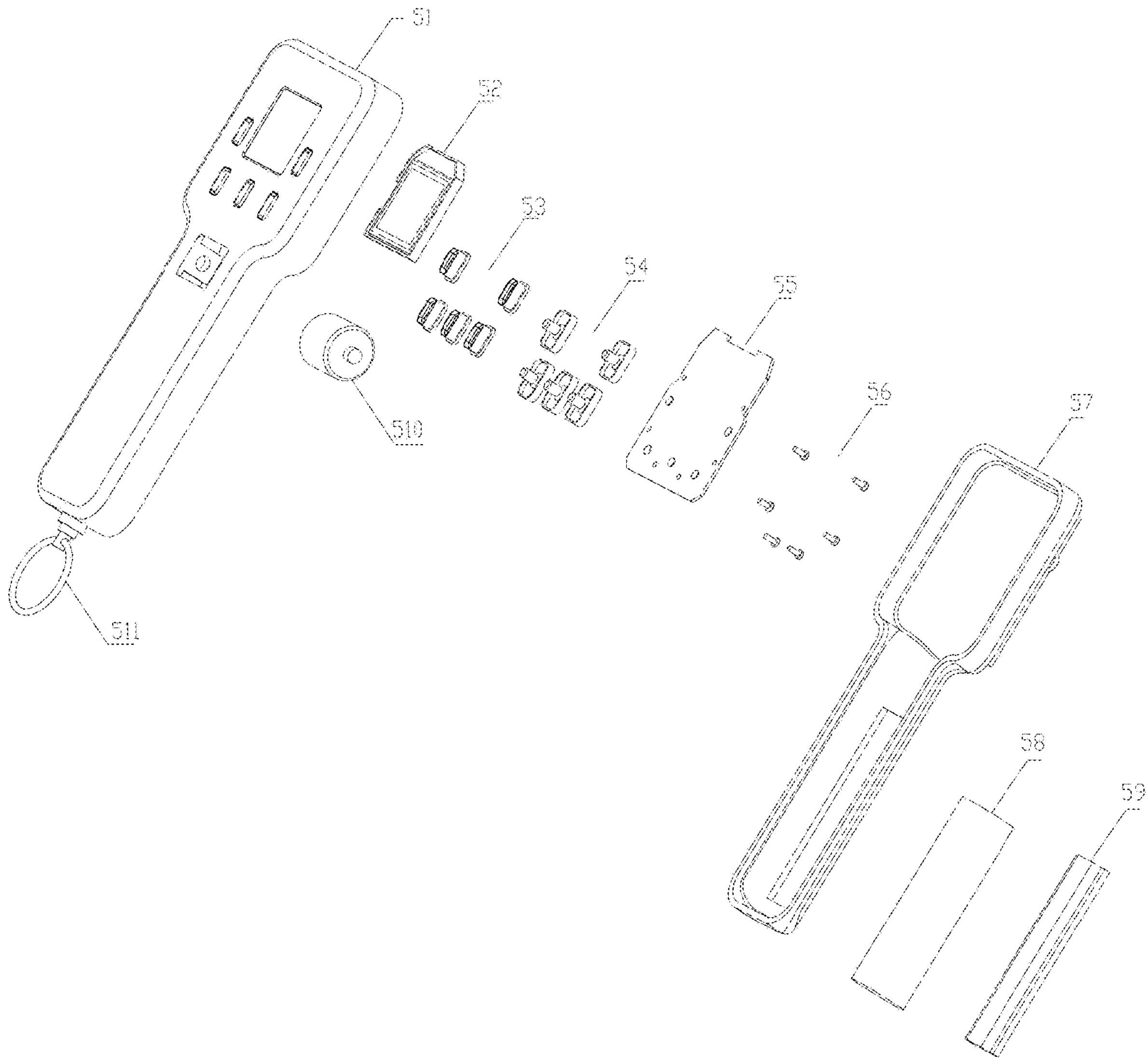
FIG. 13 is an exploded view of a handheld controller.
Figure 14:
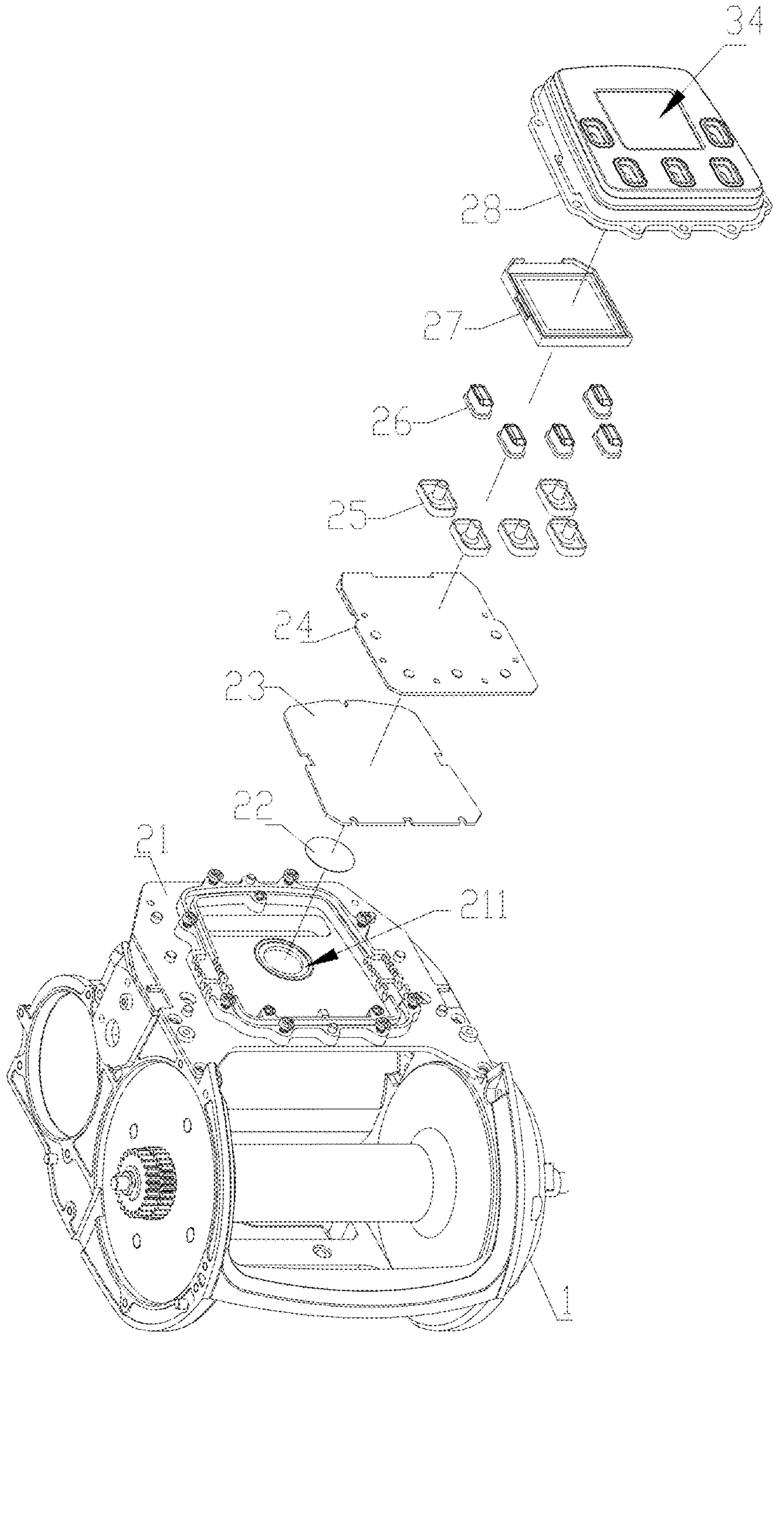
FIG. 14 is a partial diagram of FIG. 2.
Figure 15:
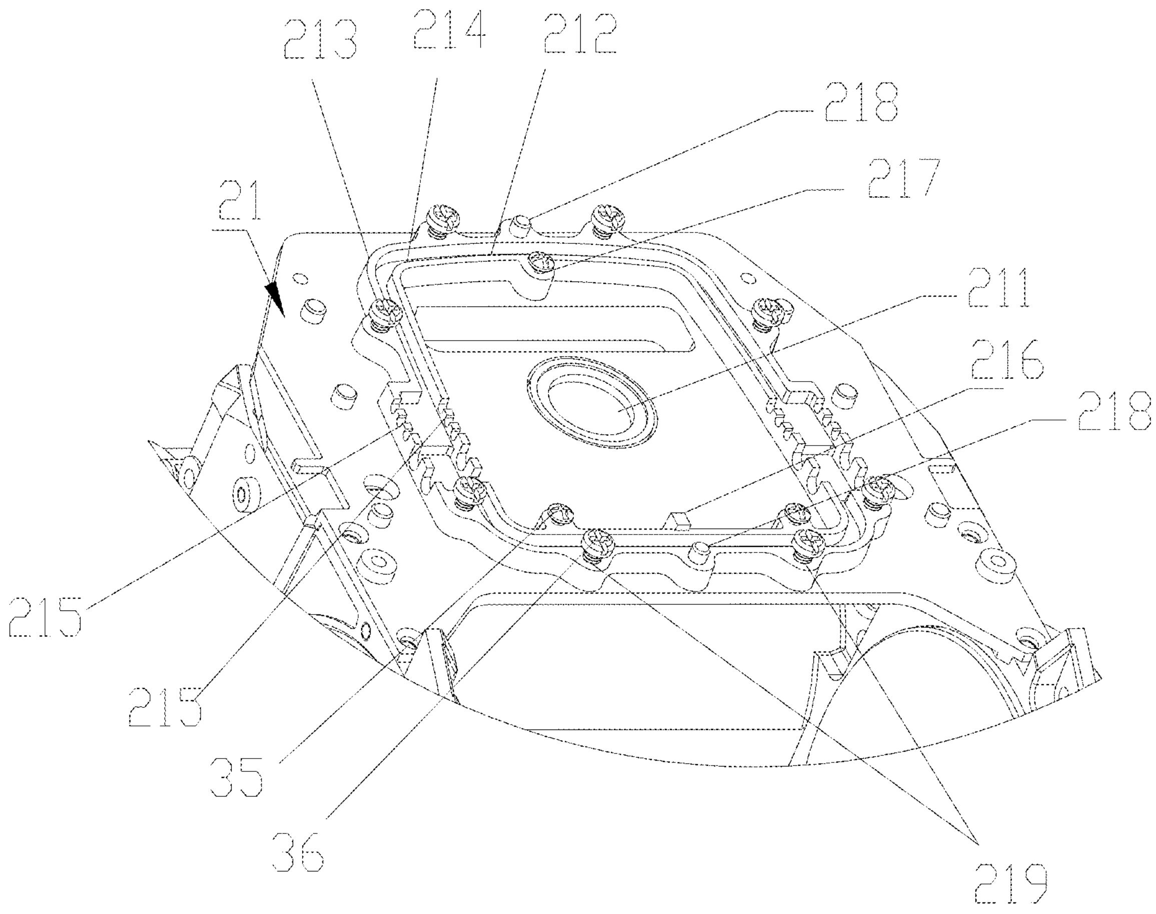
FIG. 15 is a diagram of a digital display cover plate.
Figure 16:
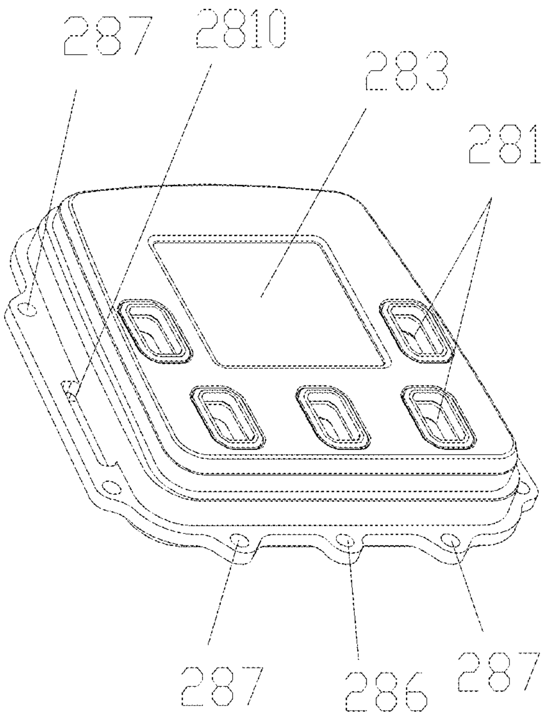
FIG. 16 is an external diagram of a digital display shell.
Figure 17:
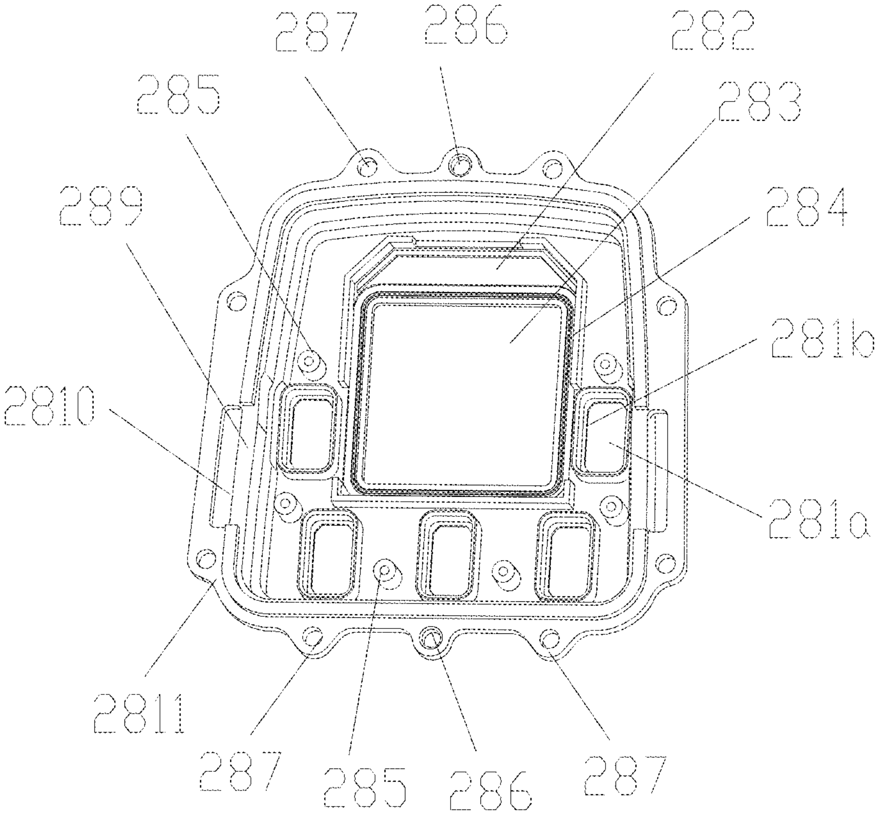
FIG. 17 is an internal diagram of a digital display shell.
Figure 18:
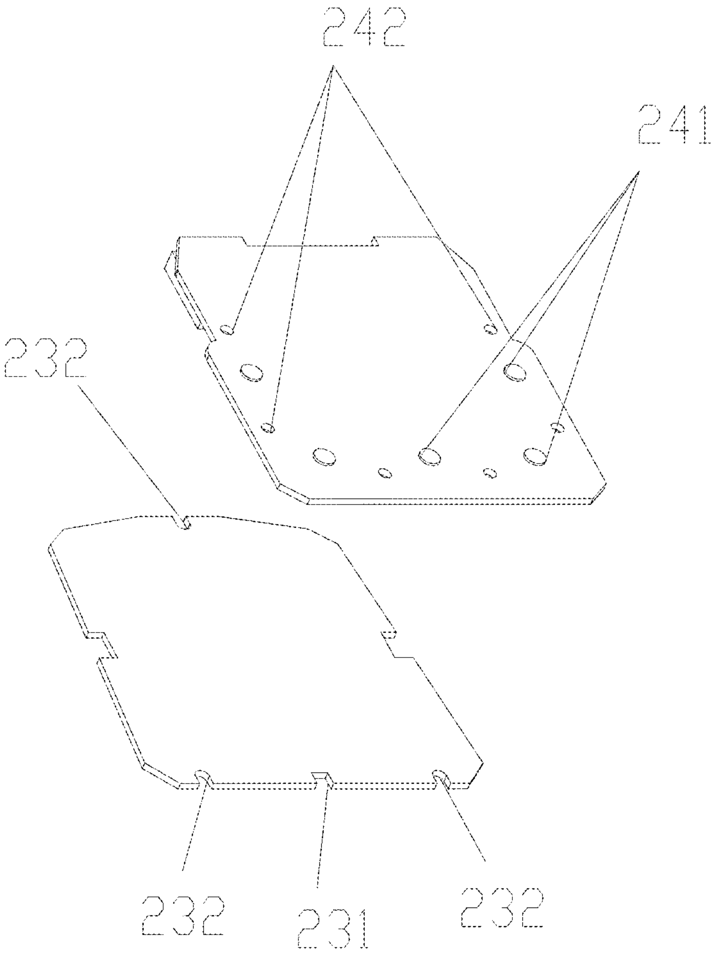
FIG. 18 is a diagram of a control board and a mainboard.
Figure 19:
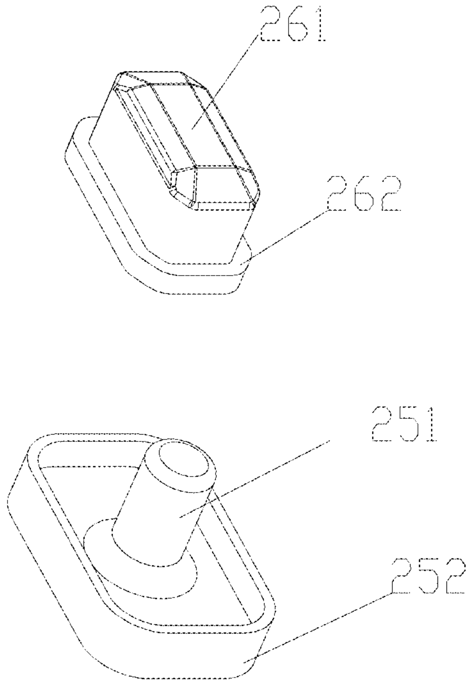
FIG. 19 is a diagram of a button and a button cover.

Referring to FIG. 11, FIG. 12 and FIG. 13, the handheld controller 50 includes a controller main body 51, a controller liquid crystal screen 52, a controller button 54, a controller circuit board 55 and a controller speed regulation switch 510. A controller button cover 53, the controller liquid crystal screen 52 and the controller button 54 are installed on the controller main body 51. The controller button 54 is installed inside the controller button cover 53. The controller button cover 53 is configured to protect the controller button 54. The controller circuit board 55 presses down the controller button 54. The controller circuit board 55 is fixed on the controller main body 51 by means of a screw and presses against the controller button 54. The controller speed regulation switch 510 is installed on the controller main body 51 and connected to the controller circuit board 55 through a wire.

A rear cover 57 of the handheld controller 50 is installed on the controller main body 51 in a snap-fitting manner, whereby achieving a waterproof function. A battery 58 is installed in a battery compartment of the controller main body 51 to supply power to the controller. A battery cover 59 covers the battery 58, whereby achieving a waterproof function. The handheld controller 50 is provided with an anti-slip ring 511. The handheld controller 50 is provided with a clip 512. The handheld controller 50 is provided with an anti-slip ring 511 and/or a clip 512. A user can tie one end of an insurance rope to the anti-slip ring 511 and the other end to a fixed position, preventing the controller falling into water accidently. The clip 512 can be clipped on a pocket or a waistband for easy portability.

Buttons in the handheld controller 50 and the mobile APP have the same function as the button on the electric reel, which is convenient for users to directly perform corresponding operations. When the handheld controller 50 is turned on or a mobile phone's Bluetooth is turned on, the handheld controller or the mobile phone is connected to the Bluetooth of the electrical fishing reel autonomously. After Bluetooth connection, the liquid crystal screen arranged on the handheld controller 50 displays the same content as the liquid crystal screen of the electric fishing reel. When the mobile phone is connected, open the mobile APP, then the mobile phone can also display the same content as the liquid crystal screen of the electric fishing reel.

Referring to FIG. 14 to FIG. 19, the frame 1 is provided with the digital display cover plate 21. The digital display shell 28 is installed on the digital display cover plate 21. A waterproof chamber is formed between the digital display shell 28 and the digital display cover plate 21. The mainboard 24, the display screen 27, the control board 23, the buzzer 22 and other parts are all positioned inside the waterproof chamber. The digital display shell 28 is provided with a button installation position 281 and a display screen installation position 282. The digital display shell 28 is provided with a window 283 corresponding to the display screen 27, and the window 283 is covered with a transparent cover 34 independent of the digital display shell 28. An inner side wall of the window 283 is surrounded by a welding wire 284. The transparent cover 34 is pressed onto the welding wire 284 and fixed to the inner side wall of the window 283 by means of ultrasonic welding. The transparent cover 34 is an acrylic sheet workpiece, which not only achieves a waterproof effect, but also solves the problem of high reject ratio of integrated injection molding.

The button installation position 281 is provided with an installation hole 281*a*. A limit platform 281*b* is formed around the installation hole 281*a*. A button cover A 26 includes a press part 261 and a limit part 262. The press part 261 of the button cover A 26 protrudes out through the installation hole 281*a*. The limit part 262 fits with the limit platform 281*b* to assemble the button cover with the digital display shell 28. The system button 25 includes a press column 251 and a support seat 252. The support seat 252 supports the press column 251. The press column 251 has a top end extending into the press part 261 of the button cover A 26 and a bottom corresponding to an operation part 241 on the mainboard 24. The button cover A 26 protects the system button 25. Users can operate the press column 251 of the system button 25 just pressing the press part 261 and thus input information into a memory of the mainboard 24.

The mainboard 24 is fixed with the digital display shell 28. The mainboard 24 is provided with a positioning hole B 242, and the digital display shell 28 is provided with a positioning column B 285. The positioning column B 285 fits with the positioning hole B 242 to position and fix the mainboard 24 to the digital display shell 28. The digital display cover plate 21 is provided with a control board positioning clip bar 216 and a control board fixing hole 217. The control board 23 is provided with a positioning engaging groove 231 and a fixing groove 232. The control board positioning clip bar 216 fits with the positioning engaging groove 231 to quickly position the control board 23 to the digital display cover plate 21. A first fixing screw 35 is inserted into the fixing groove 232 and the control board fixing hole 217 to fix the control board 23 with the digital display cover plate 21. This structure is simple to position and fix. The digital display cover plate 21 is provided with a positioning column A 218 and a first fixing hole 219. The digital display shell 28 is provided with a positioning hole A 286 and a second fixing hole 287. The positioning column A 218 fits with the positioning hole A 286 to quickly position the digital display shell 28 to the digital display cover plate 21. A second fixing screw 36 is inserted into the second fixing hole 287 and the first fixing hole 219 to fix the digital display shell 28 with the digital display cover plate 21.

The digital display cover plate 21 is formed thereon with a control board support frame 212 and a digital display shell support frame 213 higher than a bottom thereof. The control board fixing hole 217 is formed on the control board support frame 212, the positioning column A 218 and the first fixing hole 219 are provided on the digital display shell support frame 213. A glue storage groove 214 is formed between the control board support frame 212 and the digital display shell support frame 213. The digital display shell 28 is provided with a limit surface 2811 and a waterproof rib 288. The limit surface 2811 fits with the digital display shell support frame 213. The waterproof rib 288 falls into the glue storage groove 214. The control board support frame 212 and the digital display shell support frame 213 are provided with line passing groove sections 215. The waterproof rib 288 on the digital display shell 28 and corresponding missing parts of the line passing groove sections 215 form a line passing channel 289, and an outer side wall of the line passing channel 289 is provided with a glue refill hole 2810. Wires entering and exiting the digital display cover plate 21 and the digital display shell 28 can pass through the line passing channel 289.

During assembly, first, the glue storage groove 214 and the line passing channel 289 are filled with waterproof glue, the control board 23 is fixed onto the digital display cover plate 21, and the waterproof rib 288 on the digital display shell 28 falls into the glue storage groove 214, where there are gaps on two sides of the waterproof rib 288. Next, the digital display shell 28 is installed on the digital display cover plate 21, the waterproof rib 288 on the digital display shell 28 squeezes against the waterproof glue, whereby the gaps are full of waterproof glue to achieve a better waterproof effect. The limit surface 2811 on the digital display shell 28 fits with the digital display shell support frame 213, with the purpose of limiting the installation position of the digital display shell 28 and preventing the waterproof glue overflowing the glue storage groove 214. When the digital display shell 28 is installed, the glue refill hole 2810 is filled with waterproof glue, preventing the sealing glue on the wire missing to result in sealing failure.

The above are preferred embodiments of the present disclosure merely and are not intended to limit the present disclosure. For those skilled in the art, various modifications and changes can be made to the present disclosure. Any modification, equivalent substitution and improvement made within the spirit and principle of the present disclosure are intended to be included within the scope of protection of the present disclosure.

What is claimed is:

1. An intelligent electric fishing reel, comprising a frame (1), a spool assembly (6) arranged on the frame (1), a control system and an electric motor (5), the electric motor (5) being configured to drive the spool assembly (6) by means of a transmission mechanism, wherein the transmission mechanism comprises a planetary gear transmission system, a primary transmission gear (9), a secondary transmission gear, a third-stage transmission gear, a fourth-stage transmission gear (18) and a spool transmission gear (8), the planetary gear transmission system being configured to drive the primary transmission gear (9) to rotate, the secondary transmission gear comprising a secondary transmission gear A (11) and a secondary transmission gear B (12) that rotate unidirectionally and in opposite directions, the third-stage transmission gear comprising a small transmission gear (16) and a large transmission gear (17), the secondary transmission gear A (11) and the secondary transmission gear B (12) being configured to drive the small transmission gear (16) and the large transmission gear (17) respectively, wherein the small transmission gear (16), the large transmission gear (17) and the fourth-stage transmission gear (18) are engaged with one another, wherein the fourth-stage transmission gear (18) is engaged with the spool transmission gear (8); and wherein the electric motor (5) is configured to rotate in different directions to drive the secondary transmission gear A (11) or the secondary transmission gear B (12) respectively to drive the spool assembly (6).

2. The intelligent electric fishing reel according to claim 1, wherein both the secondary transmission gear A (11) and the secondary transmission gear B (12) are provided internally with an anti-reverse part (11*a*) and an installation part (11*b*), wherein roller clutches (30) fitting with the secondary transmission gear A (11) and the secondary transmission gear B (12) are provided with anti-reverse surfaces (30*a*) fitting with the anti-reverse parts (11*a*) to perform position limit, and wherein the anti-reverse surfaces (30*a*) of the roller clutches (30) corresponding to the secondary transmission gear A (11) and the secondary transmission gear B (12) face opposite directions.

3. The intelligent electric fishing reel according to claim 1, wherein the planetary gear transmission system comprises a motor gear (5*a*), a planetary gear (4*a*) and an inner gear (3); wherein the frame (1) is installed with a bearing chamber (2) and the inner gear (3) limited with the frame (1); wherein a planetary frame assembly (4) is provided with a bearing A (4*b*) and the planetary gear (4*a*), the bearing A (4*b*) being arranged inside the bearing chamber (2) on the frame (1) to position the planetary frame assembly (4) inside the frame (1); and wherein the electric motor (5) is installed inside the frame (1), the motor gear (5*a*) being engaged with the planetary gear (4*a*), and the primary transmission gear (9) being installed on a main shaft of the planetary frame assembly (4).

4. The intelligent electric fishing reel according to claim 1, wherein the spool assembly (6) is installed with a magnet (7); wherein a support plate (14) installed on the frame (1)

is provided with a sensor A (15) configured to sense the magnet (7); and wherein the spool assembly (6) is provided with a spool rotation sensing site, and the frame (1) is provided with a sensor B (31) configured to sense the spool rotation sensing site.

5. The intelligent electric fishing reel according to claim 1, wherein the control system comprises a system button (25), a display screen (27), a mainboard (24), a control board (23) and a speed regulation switch A (33); wherein the control board (23) is provided with a motor drive module (403) configured to control a startup and a rotation speed of the electric motor; and wherein the mainboard (24) is provided with a master chip CPU (401) and a current detection module (409) configured to detect a current magnitude of the electric motor (5), whereby to control the rotation direction of the electric motor (5) to start the transmission of the small transmission gear (16) or the large transmission gear (17) according to the current magnitude of the electric motor (5).

6. The intelligent electric fishing reel according to claim 5, wherein the mainboard (24) is provided with a line outgoing detection module (407) and an alarm module (404); wherein the sensor B (31) is configured to sense the rotation of the spool assembly (6) and transmit a signal to the line outgoing detection module (407) to trigger the alarm module (404); and wherein when the alarm module (404) works for more than certain time, the electric reel triggers a line retraction mode autonomously to start line retraction autonomously.

7. The intelligent electric fishing reel according to claim 5, wherein the mainboard (24) is further provided with a battery detection module (412) configured to detect a battery level, a speed detection module (411) configured to detect a rotation speed of a spool, and a temperature detection module (408) configured to detect a temperature of the mainboard (24).

8. The intelligent electric fishing reel according to claim 5, wherein the mainboard (24) is provided with a radio communication module (405), the radio communication module (405) being connected to a handheld controller (50) independent of the fishing reel, and the handheld controller (50) being provided with a button and a speed regulation button corresponding to the button and the speed regulation switch on the fishing reel.

9. The intelligent electric fishing reel according to claim 8, wherein the handheld controller (50) comprises a controller main body (51), a controller liquid crystal screen (52), a controller button (54), a controller circuit board (55) and a controller speed regulation switch (510); wherein a controller button cover (53), the controller liquid crystal screen (52) and the controller button (54) are installed on the controller main body (51), the controller button (54) being installed inside the controller button cover (53), the controller circuit board (55) pressing down the controller button (54), the controller circuit board (55) being fixed on the controller main body (51) and pressing against the controller button (54); and wherein the controller speed regulation switch (510) is installed on the controller main body (51) and connected to the controller circuit board (55) through a wire.

10. The intelligent electric fishing reel according to claim 8, wherein the handheld controller (50) is provided with an anti-slip ring (511) and a clip (512).

11. The intelligent electric fishing reel according to claim 5, wherein the mainboard (24) is provided with a radio communication module (405), the radio communication module (405) being connected to a mobile APP, the mobile APP being provided with a button and a speed regulation button corresponding to the button and the speed regulation switch on the fishing reel.

12. The intelligent electric fishing reel according to claim 1, wherein the frame is provided with a digital display cover plate (21), a digital display shell (28) being installed on the digital display cover plate (21), and a waterproof chamber being formed between the digital display shell (28) and the digital display cover plate (21); and wherein the digital display shell (28) is provided with a button installation position (281) and a display screen installation position (282), the digital display shell (28) being provided with a window (283) corresponding to the display screen (27), and the window (283) being covered with a transparent cover (34) independent of the digital display shell (28).

13. The intelligent electric fishing reel according to claim 12, wherein an inner side wall of the window (283) is surrounded by a welding wire (284); and wherein the transparent cover (34) is pressed onto the welding wire (284) and fixed to the inner side wall of the window (283) by means of ultrasonic welding.

14. The intelligent electric fishing reel according to claim 12, wherein the button installation position (281) is provided with an installation hole (281*a*), a limit platform (281*b*) being formed around the installation hole (281*a*); wherein a button cover A (26) comprises a press part (261) and a limit part (262), the press part (261) of the button cover A (26) protruding out through the installation hole (281*a*), and the limit part (262) fitting with the limit platform (281*b*); wherein the system button (25) comprises a press column (251) and a support seat (252), the press column (251) has a top end extending into the press part (261) of the button cover and a bottom corresponding to an operation part (241) on the mainboard (24).

15. The intelligent electric fishing reel according to claim 12, wherein the mainboard (24) is provided with a positioning hole B (242), and wherein the digital display shell (28) is provided with a positioning column B (285), the positioning column B (285) fitting with the positioning hole B (242).

16. The intelligent electric fishing reel according to claim 12, wherein the digital display cover plate (21) is provided with a control board positioning clip bar (216) and a control board fixing hole (217), and wherein the control board (23) is provided with a positioning engaging groove (231) and a fixing groove (232), the control board positioning clip bar (216) fitting with the positioning engaging groove (231), and a first fixing screw (35) being inserted into the fixing groove (232) and the control board fixing hole (217) to fix the control board (23) with the digital display cover plate (21).

17. The intelligent electric fishing reel according to claim 12, wherein the digital display cover plate (21) is provided with a positioning column A (218) and a first fixing hole (219), and wherein the digital display shell (28) is provided with a positioning hole A (286) and a second fixing hole (287), the positioning column A (218) fitting with the positioning hole A (286) and a second fixing screw (36) being inserted into the second fixing hole (287) and the first fixing hole (219) to fix the digital display shell (28) with the digital display cover plate (21).

18. The intelligent electric fishing reel according to claim 17, wherein the digital display cover plate (21) is formed thereon with a control board support frame (212) and a digital display shell support frame (213) higher than a bottom thereof, the control board fixing hole (217) being formed on the control board support frame (212), the positioning column A (218) and the first fixing hole (219) being provided on the digital display shell support frame (213), and a glue storage groove (214) being formed between the control board support frame (212) and the digital display shell support frame (213), wherein a digital display shell (28) is provided with a waterproof rib (288) configured to fall into the glue storage groove (214).

19. The intelligent electric fishing reel according to claim 18, wherein the digital display shell (28) is provided with a limit surface (2811) fitting with the digital display shell support frame (213).

20. The intelligent electric fishing reel according to claim 18, wherein the control board support frame (212) and the digital display shell support frame (213) are provided with line passing groove sections (215), the waterproof rib (288) on the digital display shell (28) and corresponding missing parts of the line passing groove sections (215) forming a line passing channel (289), and an outer side wall of the line passing channel (289) being provided with a glue refill hole (2810).

* * * * *